(12) United States Patent
Wittkopp et al.

(10) Patent No.: US 8,100,801 B2
(45) Date of Patent: Jan. 24, 2012

(54) 8-SPEED HYBRID TRANSMISSION

(75) Inventors: Scott H. Wittkopp, Ypsilanti, MI (US);
James M. Hart, Belleville, MI (US);
James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 401 days.

(21) Appl. No.: 12/410,535

(22) Filed: Mar. 25, 2009

(65) Prior Publication Data
US 2010/0248883 A1   Sep. 30, 2010

(51) Int. Cl.
*F16H 3/72* (2006.01)
*F16H 37/06* (2006.01)

(52) U.S. Cl. .............................. 475/5; 475/280; 475/302

(58) Field of Classification Search ........ 475/5, 275–291, 475/302, 330, 150; 180/65.21–65.26; 477/3
See application file for complete search history.

(56) References Cited

U.S. PATENT DOCUMENTS

| | | | |
|---|---|---|---|
| 5,558,595 A | 9/1996 | Schmidt et al. | |
| 5,916,050 A * | 6/1999 | Coutant et al. | 475/5 |
| 5,931,757 A | 8/1999 | Schmidt | |
| 6,371,882 B1 * | 4/2002 | Casey et al. | 477/5 |
| 6,478,705 B1 | 11/2002 | Holmes et al. | |
| 6,527,658 B2 | 3/2003 | Holmes et al. | |
| 6,962,545 B2 | 11/2005 | Larkin | |
| 7,819,772 B2 * | 10/2010 | Tenberge | 475/275 |
| 2010/0248891 A1 * | 9/2010 | Wittkopp et al. | 477/3 |

* cited by examiner

*Primary Examiner* — Justin Holmes
*Assistant Examiner* — Huan Le
(74) *Attorney, Agent, or Firm* — Quinn Law Group, PLLC

(57) ABSTRACT

The hybrid transmission has a plurality of members that can be utilized in powertrains to provide eight forward speed ratios and one reverse speed ratio. The hybrid transmission includes a motor/generator, three planetary gear sets, five torque-transmitting devices, one fixed interconnection, three external gear sets and a final drive gear set. The powertrain includes an engine and torque converter that is continuously connected to one of the planetary gear members and an output member that is continuously connected with one of the external gear sets. The five torque-transmitting devices provide interconnections between various planetary and external gear members, the input shaft, and the transmission housing, and are operated in combinations of three to establish eight forward speed ratios and one reverse speed ratio.

17 Claims, 2 Drawing Sheets

| GEAR STATE | GEAR RATIO | RATIO STEP | 80 | 82 | 84 | 85 | 86 |
|---|---|---|---|---|---|---|---|
| REV | -5.321 | | X | X | | | X |
| N | | -1.16 | | | | | |
| 1st | 4.594 | | X | X | X | | |
| 2nd | 3.010 | 1.53 | X | X | | X | |
| 3rd | 2.088 | 1.44 | | X | X | X | |
| 4th | 1.695 | 1.23 | | X | | X | X |
| 5th | 1.247 | 1.36 | | X | X | | X |
| 6th | 1.019 | 1.22 | | | X | X | X |
| 7th | 0.887 | 1.15 | X | | | X | X |
| 8th | 0.667 | 1.33 | X | | | X | X |

8-SPEED HYBRID TRANSMISSION

TECHNICAL FIELD

The present invention relates to a power transmission in a front wheel drive hybrid configuration having three planetary gear sets, three external gear sets, a final drive gear set and a motor that are controlled by five torque-transmitting devices to provide eight forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

Hybrid systems may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by a motor acting as a generator during periods when the engine is operating is utilized during these engine off periods. Transient demand for engine torque or power is supplemented by the motor during operation in engine-on, electric modes, allowing for downsizing the engine without reducing apparent vehicle performance. Additionally, the engine may be operated at or near the optimal efficiency point for a given power demand. The motor/generator is able to capture vehicle kinetic energy during braking, which is used to keep the engine off longer, supplement engine torque or power and/or operate at a lower engine speed, or supplement accessory power supplies. Additionally, the motor/generator is very efficient in accessory power generation and electric power from the battery serves as an available torque reserve allowing operation at a relatively low transmission numerical speed ratio.

SUMMARY OF THE INVENTION

An improved hybrid transmission in a front wheel drive configuration includes three planetary gear sets, three external gear sets and a final drive gear set controlled to provide eight forward speed ratios and one reverse speed ratio.

The transmission family of the present invention has three planetary gear sets positioned along first and second axes, wherein each planetary gear set includes a first, second and third member, which members may comprise a sun gear, a ring gear, or a planet carrier assembly member, in any order.

In referring to the first, second and third gear sets in this description and in the claims, these sets may be counted "first" to "third" in any order in the drawing (i.e., left to right, right to left, etc.). Additionally, the first, second or third members of each gear set may be counted "first" to "third" in any order in the drawing (i.e., top to bottom, bottom to top, etc.) for each gear set.

Each carrier member can be either a single-pinion carrier member (simple) or a double-pinion carrier member (compound). Embodiments with long pinions are also possible.

A first interconnecting member continuously connects the third member of the second planetary gear set with the first member of the third planetary gear.

Three external gear sets are positioned for transferring torque between the first and second axes, and each including first and second intermeshed external gears. A final drive external gear set is connected to an output member, and includes a first external drive gear and a second external driven gear.

The first member of the first planetary gear set is continuously connected with the first external gear of the first external gear set. The third member of the first planetary gear set is continuously connected with the first external gear of the second external gear set. The first member of the second planetary gear set is continuously connected with the second external gear of the second external gear set. The first member of the third planetary gear set is continuously connected with the second external gear of the third external gear set. The second member of the third planetary gear set is continuously connected with the external drive gear of the final drive external set.

The input member is continuously connected with the second member of the first planetary gear set. The output member is continuously connected with the second external gear (driven gear) of the final drive external gear set.

A first torque-transmitting device, such as a brake, selectively connects the first member of the first planetary gear set with a stationary member (transmission housing/casing).

A second torque-transmitting device, such as a clutch, selectively connects the second external gear of the first external gear set with the third member of the third planetary gear set.

A third torque-transmitting device, such as a clutch, selectively connects the first external gear of the third external gear set with the input member.

A fourth torque-transmitting device, such as a clutch, selectively connects the first external gear of the second external gear set with the first external gear of the third external gear set.

A fifth torque-transmitting device, such as a clutch, selectively connects the second member of the second planetary gear set with the third member of the third planetary gear set.

A motor/generator is operatively connected to the first member of the first external gear of the second external gear set.

The five torque-transmitting devices are selectively engageable in combinations of three to yield eight forward speed ratios and one reverse speed ratio.

A variety of speed ratios and ratio spreads can be realized by suitably selecting the tooth ratios of the planetary and external gear sets.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1b is a truth table and chart depicting some of the operating characteristics of the powertrain shown in FIG. 1a; and FIG. 1c is a schematic representation of the powertrain of FIG. 1a depicted in lever diagram form.

DESCRIPTION OF THE PREFERRED EMBODIMENT

Figure 1A:
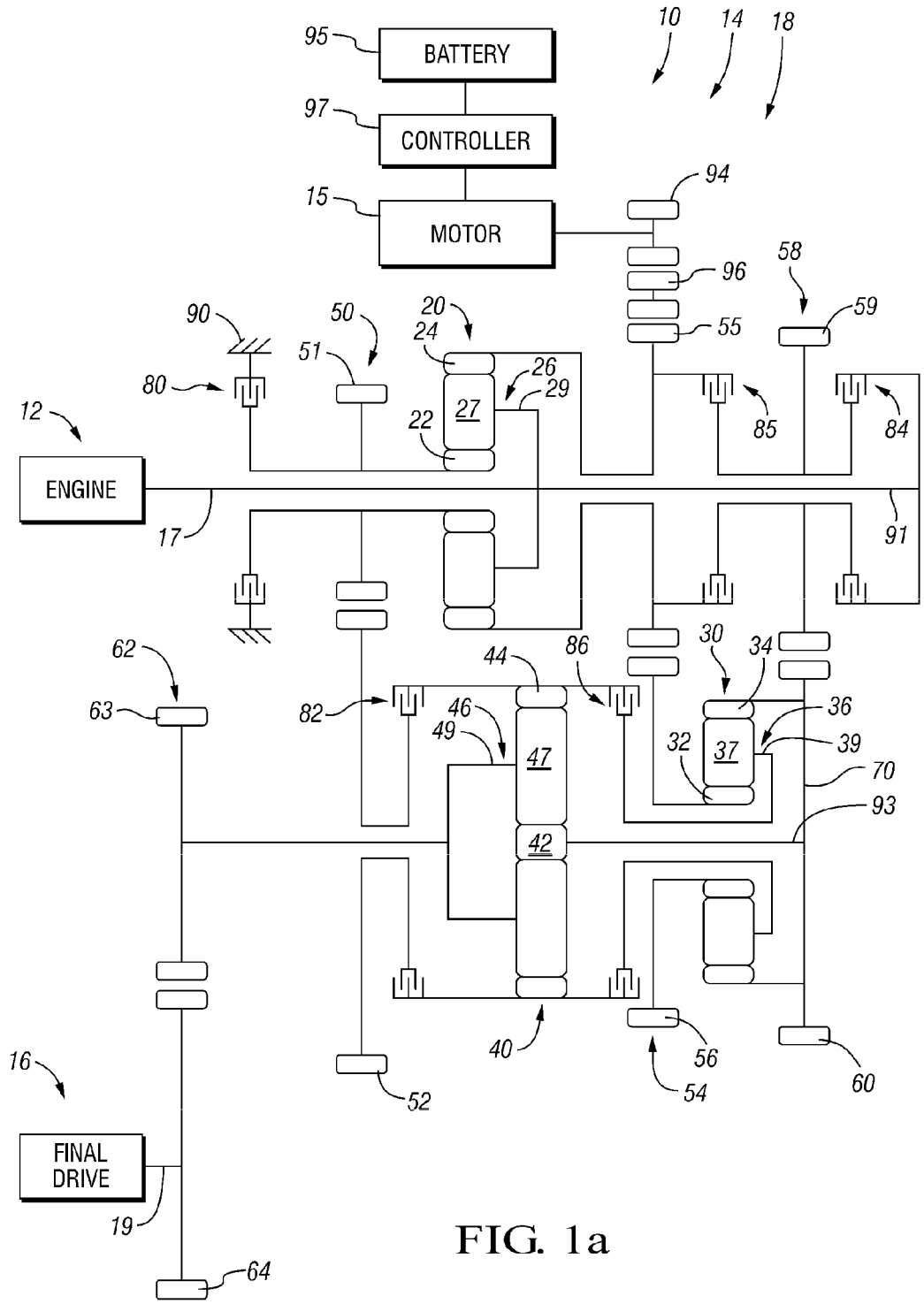
FIG. 1a is a schematic representation of a hybrid powertrain including a planetary transmission in accordance with the present invention.

Referring to the drawings, there is shown in FIG. 1a a hybrid powertrain 10 having a conventional engine and torque converter 12, a planetary transmission 14, a motor/generator 15 which is internal to the transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The front wheel drive planetary transmission 14 includes an input member 17 continuously connected with the engine 12, a planetary gear arrangement 18, and an output member 19 continuously connected with the final drive mechanism 16. The planetary gear arrangement 18 includes three planetary gear sets 20, 30, 40, three external gear sets, 50, 54, 58 and a final drive gear set 62. The planetary and external gear sets 20, 30, 40, 50, 54, and 58 are positioned along first and second axes 91, 93 as shown.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the ring gear member 24 and the sun gear member 22.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and are disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and are disposed in meshing relationship with both the ring gear member 44 and the sun gear member 42.

The first external gear set 50 includes first and second intermeshed external gears 51 and 52. The second external gear set 54 includes first and second intermeshed external gears 55 and 56. The third external gear set 58 includes first and second intermeshed external gears 59 and 60. The external gear sets 50, 54, 58 are positioned to transfer torque between the first and second axes 91, 93.

The final drive external gear set 62 includes the first external drive gear 63 and the second external driven gear 64.

The planetary gear arrangement also includes five torque-transmitting devices 80, 82, 84, 85 and 86. The torque-transmitting device 80 is a stationary-type torque-transmitting device, commonly termed brake or reaction clutch. The torque-transmitting devices 82, 84, 85 and 86 are rotating-type torque-transmitting devices, commonly termed clutches.

The input member 17 is continuously connected with the planet carrier assembly member 26 of the planetary gear set 20. The output member 19 is continuously connected with the second driven external gear 64 of the final drive external gear set 62.

An interconnecting member 70 continuously connects the ring gear member 34 of the planetary gear set 30 with the sun gear member 42 of the planetary gear set 40.

The sun gear member 22 of the planetary gear set 20 is continuously connected with the first external gear 51 of the first external gear set 50. The ring gear member 24 of the planetary gear set 20 is continuously connected with the first external gear 55 of the second external gear set 54. The sun gear member 32 of the planetary gear set 30 is continuously connected with the second external gear 56 of the second external gear set 54. The sun gear member 42 of the planetary gear set 40 is continuously connected with the second external gear 60 of the third external gear set 58. The planet carrier assembly member 46 of the planetary gear set 40 is continuously connected with the first external drive gear 63 of the final drive external gear set 62.

A first torque-transmitting device, such as brake 80, selectively connects the sun gear member 22 of the planetary gear set 20 with the transmission housing 90. A second torque-transmitting device, such as clutch 82, selectively connects the second external gear 52 of the first external gear set 50 with the ring gear member 44 of the planetary gear set 40. A third torque-transmitting device, such as clutch 84, selectively connects the first external gear 59 of the third external gear set 58 with the input member 17. A fourth torque-transmitting device, such as clutch 85, selectively connects the first external gear 55 of the second external gear set 54 with the first external gear 59 of the third external gear set 58. A fifth torque-transmitting device, such as clutch 86, selectively connects the planet carrier assembly member 36 of the planetary gear set 30 with the ring gear member 44 of the planetary gear set 40.

The motor/generator 15 is operatively connected with the first external gear 55 of the second external gear set 54 via the external gears 94 and 96.

Each embodiment of the transmission within the scope of the invention has an electric power source which is operatively connected to the motor/generator such that the motor/generator may transfer power to or receive power from the power source. A controller or ECU is operatively connected to the electric power source to control the distribution of power from or to the power source. An electric power source may be one or more batteries. Other electric power sources, such as fuel cells, have the ability to provide, or store and dispense, electric power and may be used in place of batteries without altering the concepts of the present invention.

Returning now to the description of the power sources, it should be apparent from the foregoing description, and with particular reference to FIG. 1a, that the transmission 14 selectively receives power from the engine 12. The hybrid transmission also receives power from an electric power source 95, which is operably connected to a controller 97. The electric power source 95 may be one or more batteries. Other electric power sources, such as capacitors or fuel cells, that have the ability to provide, or store, and dispense electric power may be used in place of or in combination with batteries without altering the concepts of the present invention.

Figures 1B, 1C:
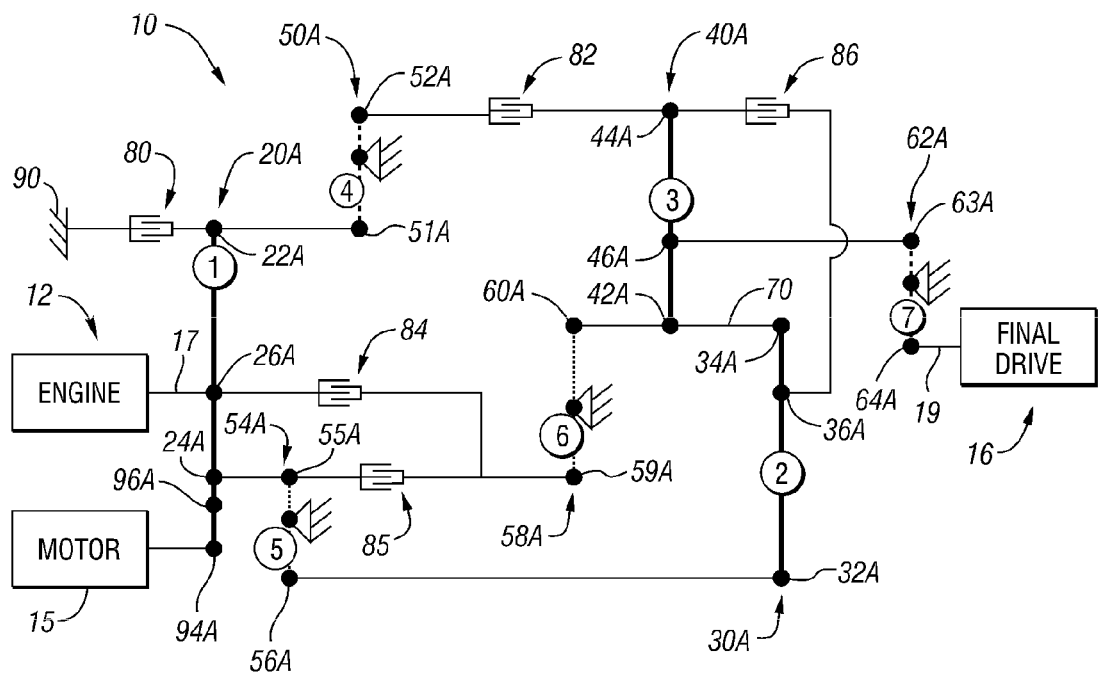

As shown in FIG. 1b, and in particular the truth table disclosed therein, the torque-transmitting devices are selectively engaged in combinations of three to provide eight forward speed ratios and one reverse speed ratio, all with single transition sequential shifts and a double overdrive ratio.

As set forth above, the engagement schedule for the torque-transmitting devices is shown in the truth table of FIG. 1b. The chart of FIG. 1b describes the ratio steps that are attained in the above described transmission. For example, the step ratio between the first and second forward speed ratios is 1.53, while the step ratio between the reverse speed ratio and first forward ratio is −1.16.

Referring to FIG. 1c, the embodiment of powertrain 10 depicted in FIG. 1a is illustrated in a lever diagram format. A lever diagram is a schematic representation of the components of a mechanical device such as an automatic transmission. Each individual lever represents a planetary gear set or an external gear set. In the planetary gear set levers the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Vertical dashed lines with a grounded pivot point represent external gear sets. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

As shown in FIG. 1c, the powertrain 10 includes an input member 17 continuously connected with the engine 12, an output member 19 continuously connected with the final drive mechanism 16, a first planetary gear set 20A having three nodes: a first node 22A, a second node 26A and a third node 24A; a second planetary gear set 30A having three nodes: a first node 32A, a second node 36A and a third node 34A; and a third planetary gear set 40A having three nodes: a first node 42A, a second node 46A and a third node 44A. The powertrain 10 also includes a first external gear set 50A having two external gears: a first external gear 51A and a second external gear 52A; a second external gear set 54A having two external gears: a first external gear 55A and a second external gear 56A; a third external gear set 58A having two external gears: a first external gear 59A and a second external gear 60A; and a final drive gear set 62A with two external gears: a external drive gear 63A and a external driven gear 64A.

The input member 17 is continuously connected with the node 26A. The output member 19 is continuously connected with the external gear 64A. The motor 15 is continuously connected with the external gears 94A and 96A.

The node 34A is continuously connected with the node 42A via interconnecting member 70. The node 22A is continuously connected with the external gear 51A. The node 24A is continuously connected with the external gear 55A. The node 32A is continuously connected with the external gear 56A. The node 42A is continuously connected with the external gear 60A and with node 34A via interconnecting member 70. The node 46A is continuously connected with external drive gear 63A.

A first torque-transmitting device, such as brake 80, selectively connects the node 22A with the transmission housing 90. A second torque-transmitting device, such as clutch 82, selectively connects the external gear 52A with the node 44A. A third torque-transmitting device, such as clutch 84, selectively connects the external gear 59A with the input member 17 and with node 26A. A fourth torque-transmitting device, such as clutch 85, selectively connects the external gear 55A with the external gear 59A. A fifth torque-transmitting device, such as clutch 86, selectively connects the node 36A with the node 44A.

To establish ratios, three torque-transmitting devices are engaged for each gear state. The engaged torque-transmitting devices are represented by an "X" in each respective row of FIG. 1b. For example, to establish reverse gear, the brake 80 and clutches 82, 86 are engaged. The brake 80 engages the node 22A with the transmission housing 90. The clutch 82 engages the external gear 52A with the node 44A. The clutch 86 engages the node 36A with the node 44A. Likewise, the eight forward ratios are achieved through different combinations of clutch engagement as per FIG. 1b.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed hybrid transmission comprising:
an input member;
an output member;

first, second and third planetary gear sets each having first, second and third members, said gear sets being positioned along first and second axes;

an interconnecting member continuously connecting said third member of said second planetary gear set with said first member of said third planetary gear set; wherein no other one of said members of said second planetary gear set is continuously connected with any other one of said members of said third planetary gear set;

first, second and third external gear sets positioned for transferring torque between said first and second axes, said first, second and third external gear sets each including first and second intermeshed external gears;

a motor/generator operatively connected with said first external gear of said second external gear set;

five torque-transmitting devices each of which selectively interconnects a respective one of said members of said planetary gear sets or a respective one of said first and second external gears of said three external gear sets with a stationary member, with said input member, with another respective one of said members of said planetary gear sets, or with another respective one of said first and second external gears of said three external gear sets, said five torque-transmitting devices being engaged in combinations of three to establish at least eight forward speed ratios and at least one reverse speed ratio between said input member and said output member; and wherein one of said five torque-transmitting devices is operable for selectively interconnecting said second member of said second planetary gear set with said third member of said third planetary gear set for rotation at the same speed.

2. The hybrid transmission defined in claim 1, wherein said first member of said first planetary gear set is continuously connected with said first external gear of said first external gear set; said third member of said first planetary gear set is continuously connected with said first external gear of said second external gear set; said first member of said second planetary gear set is continuously connected with said second external gear of said second external gear set; said first member of said third planetary gear set is continuously connected with said second external gear of said third external gear set; and said second member of said third planetary gear set is continuously connected with an external drive gear of a final drive external gear set.

3. The hybrid transmission of claim 1, wherein said output member is connected with a final drive external gear set, and said final drive external gear set is connected with said second member of said third planetary gear set.

4. The hybrid transmission of claim 1, wherein said first, second and third members of said first, second and third planetary gear sets comprise a sun gear member, a planet carrier assembly member and a ring gear member, respectively.

5. The hybrid transmission of claim 1, wherein said input member is continuously connected with said second member of said first planetary gear set, and said output member is continuously connected with a driven external gear of a final drive external gear set.

6. The hybrid transmission of claim 1, wherein said first planetary gear set positioned on said first axis, and said second and third planetary gear sets are positioned on said second axis.

7. The hybrid transmission of claim 1, wherein a first of said five torque-transmitting devices is operable for selectively connecting said first member of said first planetary gear set with said stationary member.

8. The hybrid transmission of claim 7, wherein a second of said five torque-transmitting devices is operable for selectively connecting said second external gear of said first external gear set with said third member of said third planetary gear set.

9. The hybrid transmission of claim 8, wherein a third of said five torque-transmitting devices is operable for selectively connecting said first external gear of said third external gear set with said input member.

10. The hybrid transmission of claim 9, wherein a fourth of said five torque-transmitting devices is operable for selectively connecting said first external gear of said second external gear set with said first external gear of said third external gear set.

11. A multi-speed hybrid transmission comprising:
an input member;
an output member;
first, second and third planetary gear sets each having first, second and third members, said planetary gear sets being positioned along first and second axes;
an interconnecting member continuously connecting said third member of said second planetary gear set with said first member of said third planetary gear set;
first, second and third external gear sets positioned for transferring torque between said first and second axes, said three external gear sets each including first and second intermeshed external gears;
a motor/generator operatively connected with said first external gear of said second external gear set;
a first torque-transmitting device selectively connecting said first member of said first planetary gear set with a stationary member;
a second torque-transmitting device selectively connecting said second external gear of said first external gear set with said third member of said third planetary gear set;
a third torque-transmitting device selectively connecting said first external gear of said third external gear set with said input member;
a fourth torque-transmitting device selectively connecting said first external gear of said second external gear set with said first external gear of said third external gear set;
a fifth torque-transmitting device selectively connecting said second member of said second planetary gear set with said third member of said third planetary gear set; and
said five torque-transmitting devices being engaged in combinations of three to establish at least eight forward speed ratios and at least one reverse speed ratio between said input member and said output member.

12. The hybrid transmission of claim 11, wherein said first, second and third members of said first, second and third planetary gear sets comprise a sun gear member, a planet carrier assembly member and a ring gear member, respectively.

13. The transmission of claim 11, wherein said first member of said first planetary gear set is continuously connected with said first external gear of said first external gear set; said third member of said first planetary gear set is continuously connected with said first external gear of said second external gear set; said first member of said second planetary gear set is continuously connected with said second external gear of said second external gear set; said first member of said third planetary gear set is continuously connected with said second external gear of said third external gear set; and said second member of said third planetary gear set is continuously connected with an external drive gear of a final drive external set.

14. The transmission of claim 11, wherein said input member is continuously connected with said second member of said first planetary gear set, and said output member is continuously connected with a second external gear of a final drive external gear set.

15. A multi-speed transmission comprising:
an input member;
an output member;
first, second and third planetary gear sets each having a sun gear member, a planet carrier assembly member and a ring gear member, said planetary gear sets being positioned along first and second axes;
an interconnecting member continuously connecting said ring gear member of said second planetary gear set with said sun gear member of said third planetary gear set;
first, second and third external gear sets positioned for transferring torque between said first and second axes, said first, second and third external gear sets each including first and second intermeshed external gears;
a motor/generator operatively connected with said first external gear of said second external gear set;
a first torque-transmitting device selectively connecting said sun gear member of said first planetary gear set with a stationary member;
a second torque-transmitting device selectively connecting said second external gear of said first external gear set with said ring gear member of said third planetary gear set;
a third torque-transmitting device selectively connecting said first external gear of said third external gear set with said input member;
a fourth torque-transmitting device selectively connecting said first external gear of said second external gear set with said first external gear of said third external gear set;
a fifth torque-transmitting device selectively connecting said planet carrier assembly member of said second planetary gear set with said ring gear member of said third planetary gear set; and
said five torque-transmitting devices being engaged in combinations of three to establish at least eight forward speed ratios and at least one reverse speed ratio between said input member and said output member.

16. The transmission of claim 15, wherein said sun gear member of said first planetary gear set is continuously connected with said first external gear of said first external gear set; said ring gear member of said first planetary gear set is continuously connected with said first external gear of said second external gear set; said sun gear member of said second planetary gear set is continuously connected with said second external gear of said second external gear set; said sun gear member of said third planetary gear set is continuously connected with said second external gear of said third external gear set; and said planet carrier assembly member of said third planetary gear set is continuously connected with an external drive gear of a final drive external set.

17. The transmission of claim 15, wherein said input member is continuously connected with said planet carrier assembly member of said first planetary gear set, and said output member is continuously connected with a second external gear of a final drive external gear set.

* * * * *